United States Patent
Haustein et al.

(10) Patent No.: US 7,472,300 B1
(45) Date of Patent: Dec. 30, 2008

(54) SERVER-MANAGED POWER SAVING POLICIES FOR AUTOMATED TAPE LIBRARIES AND DRIVES

(75) Inventors: Nils Haustein, Soergenloch (DE); Ulf Troppens, Mainz (DE); Frank Krick, Ockenheim (DE); Daniel James Winarski, Tuscon, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/099,094

(22) Filed: Apr. 7, 2008

(51) Int. Cl.
*G06F 1/26* (2006.01)

(52) U.S. Cl. .................. 713/323; 713/300; 711/100; 707/200

(58) Field of Classification Search ............. 713/300, 713/323; 707/200; 711/100
See application file for complete search history.

(56) References Cited

U.S. PATENT DOCUMENTS

| | | | |
|---|---|---|---|
| 5,600,840 A | 2/1997 | Pearce et al. |
| 5,666,538 A | 9/1997 | DeNicola |
| 6,356,803 B1 | 3/2002 | Goodman et al. |
| 6,865,640 B2 | 3/2005 | Dimitri et al. |
| 7,334,138 B2 | 2/2008 | Lu |
| 7,340,616 B2 | 3/2008 | Rothman et al. |
| 2005/0210304 A1 | 9/2005 | Hartung et al. |

FOREIGN PATENT DOCUMENTS

WO    WO 9811544 A1    3/1998

*Primary Examiner*—Tse Chen
(74) *Attorney, Agent, or Firm*—McGinn IP Law Group, PLLC

(57) ABSTRACT

A method of controlling tape drives within a tape drive library where a backup server utilizes client backup schedules and pending client restore requests to efficiently control the powering on and off of tape drives within a tape drive library.

1 Claim, 5 Drawing Sheets

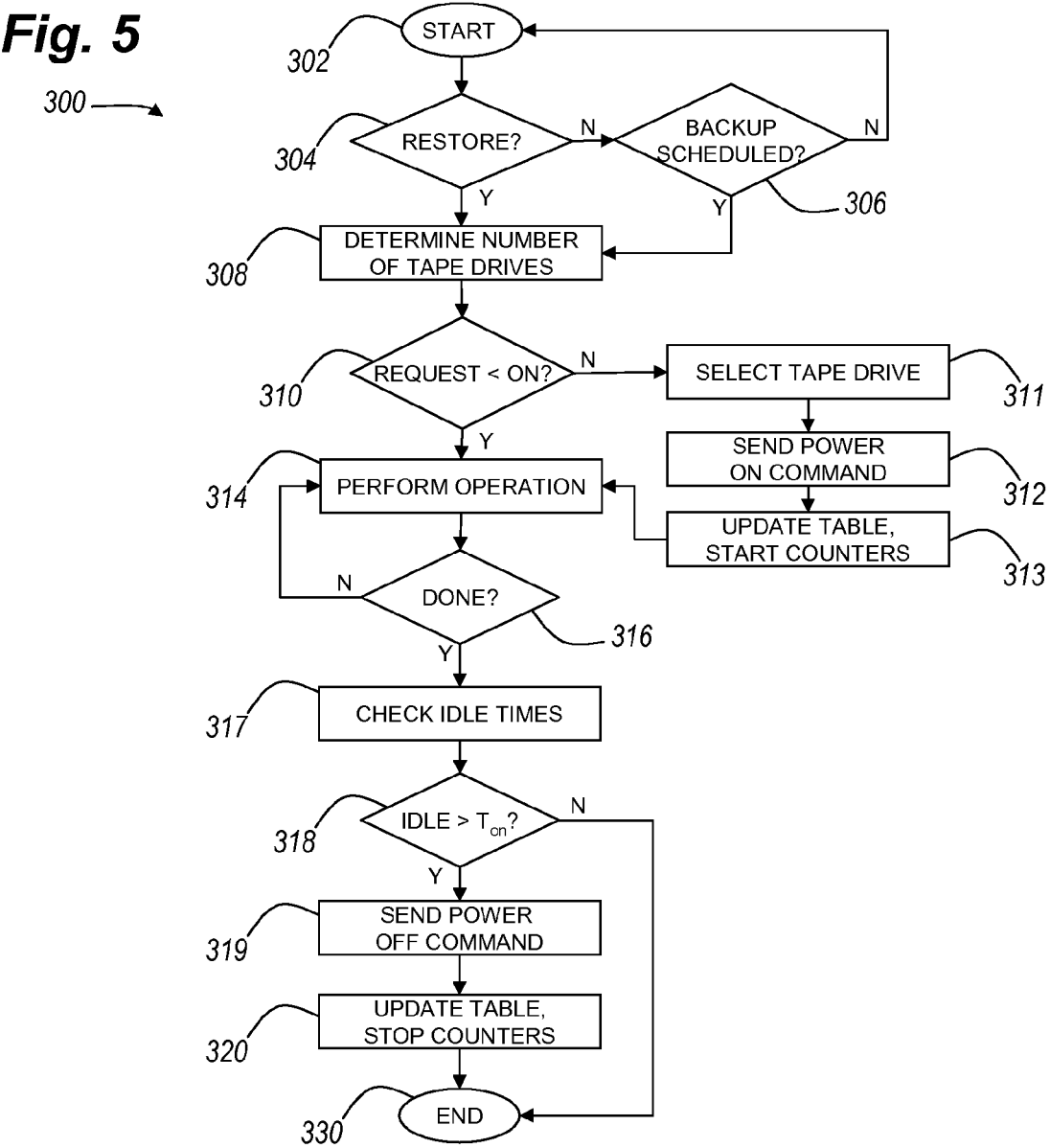

SERVER-MANAGED POWER SAVING POLICIES FOR AUTOMATED TAPE LIBRARIES AND DRIVES

BACKGROUND OF THE INVENTION

1. Field of the Invention

The present invention generally relates to a method and system of controlling tape drives within a tape drive library where a backup server utilizes client backup schedules and pending client restore requests to efficiently control the powering on and off of tape drives within a tape drive library.

2. Description of the Related Art

Tape libraries according to prior art include a plurality storage slots with or without tape cartridges, one or more robots for transporting tape cartridges from slots to drives and a plurality of tape drives. A tape drive library such as IBM™ TS3500 can include up to 192 Linear Tape Open (LTO) or IBM™ TS1120 drives.

The tape drives included in a tape drive library in addition to tape drives in a standalone configuration are generally not utilized every minute or hour of the day. Tape drives are usually used for backup or restore functions. Many customers perform one or two backups per day for every client and data restores happen infrequently and are sporadic. In addition some tape drives might be used for other activities such as media-conditioning or space-reclamation. Even with all these functions taking place on the installed tape drives, a tape drive is never utilized 100% on each day of the week. Thus, tape drives have much idle time when they are not working during many periods of the day. Over certain periods, such as weekends, the non-utilization period may be even longer. FIGS. 1A and 1B give an example of tape drive utilization of a typical customer environment.

According to the utilization charts in FIGS. 1A and 1B, it can be seen that several drives might not be needed during several hours of a day. These tape drives are powered on and consuming power while not involved in any data recording or restoring function. A single tape drive according to a representative specification consumes between 125 to 130 W (at 0.5 A, and 250-260V). An operational drive unused in a tape drive library for 24 hours it will consume approximately 3 KWh, (calculated at 125 W), that is equivalent to creating 1.98 Kg of $CO_2$. Additionally, a large number of tape drives typically installed in a commercial tape drive library are provided in anticipation of a major disaster where large amounts of data must be restored over a short period of time to meet defined Recovery Time Objective (RTO). Thus, the number of tape drives typically installed in a tape drive library system for a backup solution is the number of drives required for daily backup operations.

Tape drives and tape libraries are typically part of backup solutions shown in the client server backup architecture of FIG. 2.

Multiple backup clients 102 are connected to a network 106, which connects them to backup server 107. Backup server 107 is connected to the tape drive library and drives 110 via network 120. Additionally, backup server 107 is connected to the tape drive library 110 via a management network 118. The networks 106, 118 and 120 might be different networks as shown or it might also be one and the same network. These networks may be based on Ethernet and the Transmission Control Protocol and Internet Protocol (TCP/IP) or on a different type of network such as fibre channel with the Small Computer System Interface (SCSI) or Fibre Channel over Internet Protocol (FCIP).

The backup clients 102 include data to be backed up which is stored on file systems 108. Furthermore the backup clients 102 include backup client software which sends the files for backup 112 from the local file system 108 to the server 107.

The backup server 107 is a software application running on a computer system. The backup server 107 stores, or backups 112 the files sent by the backup client 102 on tape drive library 110.

One example for a backup server is IBM™ Tivoli Storage Manager™ which also provides backup clients for different purposes such as file system backup or database backup.

The backup process 112 is defined as the clients 102 sending the files to the server 107. This process is usually triggered by predetermined schedules defined by an administrator within the server 107. Thus, the backup server 107 has knowledge of the client 102 backup schedules. These schedules are executed automatically and can be planned efficiently to avoid having to many clients 102 backing up data to the server 107 at the same time. A backup schedule usually contains information about a client name, the number of sessions, a start date and start time. Backup schedules are stored in the server 107, for example, in a database which the server 107 uses to store the schedule information. When a backup process 112 starts, the backup server 107 also selects the appropriate storage medium and tape drive 110 for that particular backup operation.

The restore process 114 is usually initiated by the backup client 102 having the need to retrieve data from the server 107 which has been lost in the local file system 108. During the restore process 114, the backup client 102 requests the data from the backup server 107. The data is usually denoted by names representing file names. The backup server 107 keeps a local database where it stores the data referenced by the names. The backup server 107 uses this database to locate the data requested by the client 102 and send or restore 114 this data to the client 102. The backup client 102 then stores the files in the appropriate directories of the local file system 108.

Based on the backup solution according to prior art, (FIG. 2), it becomes obvious that the backup server 107 has specific knowledge about the client 102 backup schedules. This information is used in the present invention to efficiently control the powering on and off of tape drives.

The fact that tape drives are not utilized 100% during the day makes it necessary to implement power saving techniques where tape drives are only powered on as they are needed. Powering on a tape drive takes usually between 60 to 120 seconds, and mounting a tape usually takes between 30 to 60 seconds. Thus, the additional time required to power on a tape drive has only a medium impact to the overall backup 112 or restore 114 operations. The present invention anticipates that the tape drives may be powered on before the backup processed 114 starts by utilizing the backup schedules stored in the backup server. This means that controlling the powering off and on of tape drives may not have any impact to the backup operation.

Tape drives according to prior art, such as the IBM™ TS1120 tape drive, implements power saving methods whereby the tape drive enters a power saving mode when it has not been used for a predetermined period of time. This method has a critical drawback in that it is independent of any backup and restore operation, leading to inefficient power saving cycles. More precisely, the tape drive itself does not know when a backup function scheduled to start, and it does not know when it is selected by the backup server. It may occur that the tape drive enters a power saving mode after a predetermined period of time, wherein immediately thereafter, it must power on again because the server has selected it for a backup or restore operation. This is inefficient. However, the present invention utilizes the knowledge of the backup server about the client backup schedules and pending client restore requests to efficiently control powering on and off tape drives within a tape drive library.

SUMMARY OF THE INVENTION

In view of the foregoing and other exemplary problems, drawbacks, and disadvantages of the conventional methods and structures, a purpose of the exemplary aspects of the present invention is to provide a method and system that utilizes the knowledge of the backup server regarding client backup schedules and pending client restore requests to efficiently control the powering on and off of tape drives within a tape drive library.

An exemplary aspect of the present invention includes method for controlling power to a tape drive in an automated tape drive library, the method includes determining if a request to perform a restore of data from the tape drive library, and to backup data to the tape drive library has been made, wherein the operation to backup data further includes retrieving a backup schedule and determining from the schedule when a requested backup is to be performed, determining a required number of tape drives for the requested operation, determining an available number of powered tape drives in the tape drive library, selecting specific tape drives from the tape drive library based on determining if the required number of tape drives is greater than the available number of powered tape drives in the tape drive library, commanding a power control module to power the selected specific tape drives from the tape drive library, updating a power state value and resetting a cumulative operating time value for each of the selected specific tape drives, performing the requested operation and repeating until completed if the requested operation is incompletely performed, determining the cumulative operating time value and the cumulative idle time value of each tape drive in the tape drive library, determining tape drives in the tape drive library that include the cumulative idle time value greater than a predetermined idle time threshold, commanding to power off the determined tape drives in the tape drive library that include the cumulative idle time value less than a predetermined idle time threshold, and updating the power state value, and resetting the cumulative operating time value and the cumulative idle time value for each of the determined tape drives in the tape drive library.

Another exemplary aspect of the present invention includes determining if the request to perform the operation to backup data is scheduled to start within a short period of time of a current date and time.

Another exemplary aspect of the present invention includes wherein the determining the available number of powered tape drives is determined from retrieving a stored power state value for each tape drive in the tape drive library from a database, the power state value represents a powered state for each tape drive.

Another exemplary aspect of the present invention includes wherein the database is a tape drive state table includes specific tape drive address values for each tape drive in the tape drive library, a power state value for each tape drive in the tape drive library, an cumulative operating time value for each tape drive in the tape drive library, and a cumulative idle time value for each tape drive in the tape drive library.

Another exemplary aspect of the present invention includes wherein the power state value for each tape drive is one from the group includes a powered on and idle communication state, a powered on and active communication state, and a powered off state.

Another exemplary aspect of the present invention includes wherein the selecting specific tape drives from the tape drive library further includes selecting specific tape drive based on a tape drive address, a powered off state value corresponding to the tape drive address, and a cumulative operating time corresponding to the tape drive address.

Another exemplary aspect of the present invention includes a system for controlling power to a tape drive in an automated tape drive library by a backup server, the system includes a backup server that receives and generates requests to perform an operation to one of restore data from data stored in the tape drive library to a data client, and to backup client data to the tape drive library, wherein the operation to backup client data further includes retrieving a backup schedule and wherein the backup server determines from the schedule when a requested backup is to be performed, the backup server determines a required number of tape drives for the requested operation and then determines an available number of powered tape drives in the tape drive library, the backup server selects specific tape drives from the tape drive library based on determining if the required number of tape drives is greater than the available number of powered tape drives in the tape drive library, the backup server commands a power control module to power the selected specific tape drives from the tape drive library, updates a power state value, and resets a cumulative operating time value in a stored drive state table on the backup server for each of the selected specific tape drives, the backup server performs the requested operation and repeats the requested operation if necessary until the performance is completed, the backup server determines the cumulative operating time value and the cumulative idle time value of each tape drive in the tape drive library, and further determines tape drives in the tape drive library that include the cumulative idle time value greater than a predetermined idle time threshold, and the backup server transmits a power off command the determined tape drives in the tape drive library that include the cumulative idle time value less than a predetermined idle time threshold, and updates the power state value and resets the cumulative operating time value and the cumulative idle time value for each of the determined tape drives in the tape drive library.

With its unique and novel features, the present invention provides a method and system for utilizing the knowledge of the backup server regarding client backup schedules and pending client restore requests to efficiently control the powering on and off of tape drives within a tape drive library

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 4 illustrates a first exemplary embodiment of server-managed power saving method for automated tape libraries and drives, showing a power state table, according to an exemplary aspect of the present invention;

FIG. 5 illustrates a first exemplary embodiment of server-managed power saving method for automated tape libraries and drives, showing a logical flowchart according to an exemplary method of the present invention;

DETAILED DESCRIPTION OF EXEMPLARY EMBODIMENTS OF THE INVENTION

Figure 1A:
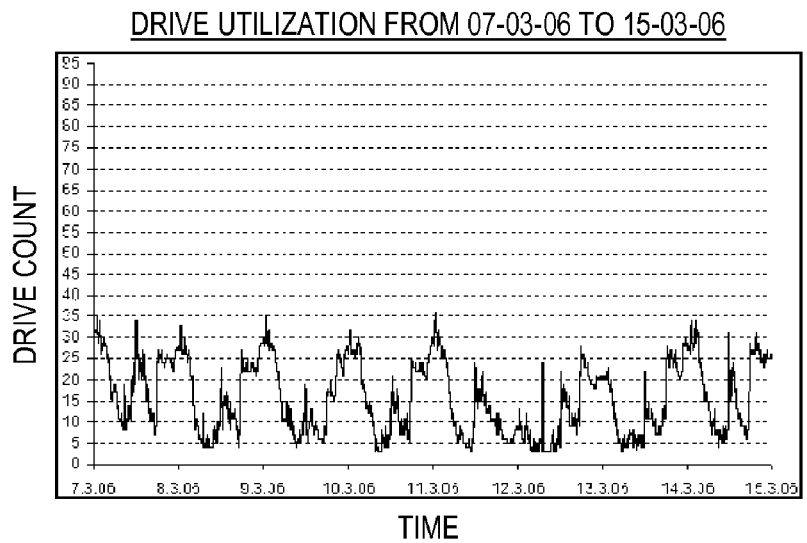
FIG. 1A illustrates a prior art example of tape drive utilization graph of a typical customer environment.
Figure 1B:
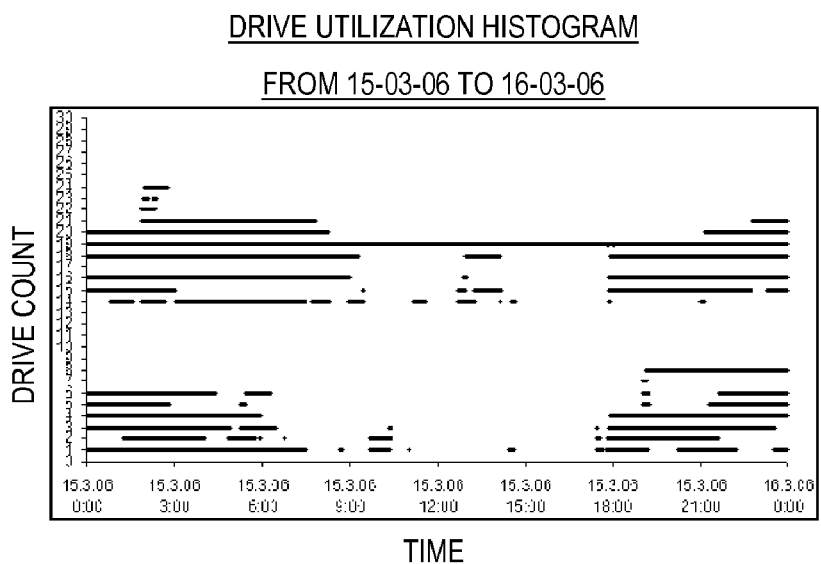
FIG. 1B illustrates a prior art example of tape drive utilization histogram of a typical customer environment.

Referring now to the drawings, and more particularly to FIGS. 3-5, 7 and 9, there are shown exemplary embodiments of the method and structures of the present invention.

Overview

The present invention describes a system and methods pertaining to a backup application controlling the power state of tape drives within an automated tape drive library based on planned and unplanned backup and restore operations. The backup application thereby autonomously predicts when tape drives of the tape drive library are required for backup based on client backup schedules, and instructs a power control module to power on or off tape drives depending on the prediction. Additionally, the backup application controls the power of the tape drives upon a restore request prior to the start of the restore process.

There are multiple embodiments for controlling the power state of a tape drive. In one embodiment, the backup server sends a command directly to the tape drive instructing the tape drive to change its power state. According to this embodiment, the tape drive cannot be powered off completely.

In another embodiment, the backup server uses the tape drive library controller in an automated tape drive library to control the power state of other tape drives in that library. Thereby the tape drives can be powered off completely.

In yet another embodiment, an out-band connection such as a management network 118 is used to control the power state of tape drives.

This invention in general can be applied to storage management software, (backup software, archive software), that manages automated storage media libraries such as disk libraries (e.g., Cheetah™ brand disk drives), tape libraries (such as the IBM™ TS3500) or optical libraries (such as Plasmon™ G Series Ultra Density Optical (UDO) libraries).

Exemplary Aspects

Figure 2:
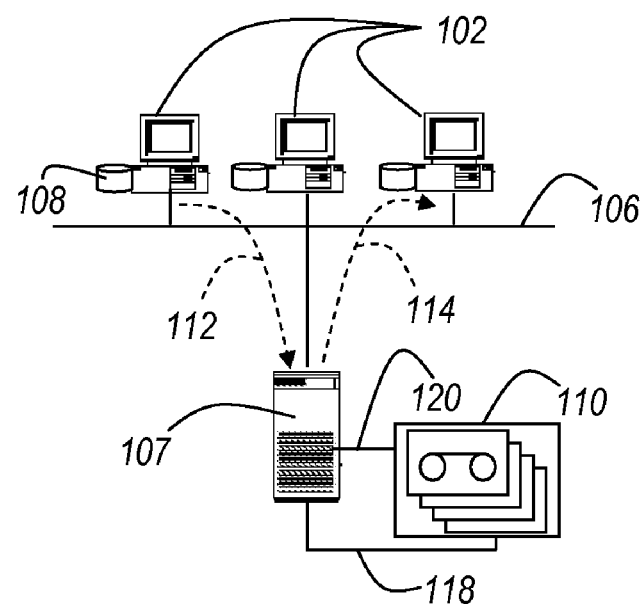
FIG. 2 illustrates a prior art embodiment of a tape drive library networked architecture.
Figure 3:
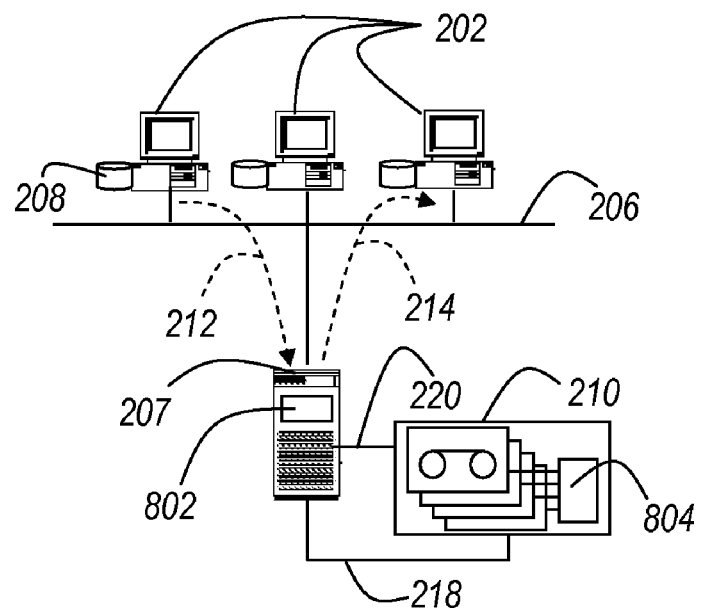
FIG. 3 illustrates a first exemplary embodiment of server-managed power saving method for automated tape libraries and drives, according to an exemplary aspect of the present invention.

The backup solution according to the present invention is presented in FIG. 3, is similar to the backup system of FIG. 2, including backup clients 202 each including a file system 208, wherein each backup client 202 is connected to a backup server 207 by a network 206 for backing up files 212 and restoring files 214 to a tape drive library 210 managed by the backup server 207 over a data network 220 and/or a management network 218.

Two new components introduced in the present invention are the prediction module 802 which is part of the backup server 207, and the power control module 804 which is part of the automated tape drive library 210. The prediction module 802 of the present invention includes a method to predict whether a tape drive is needed based on client backup schedules and client restoration requests. As a result of the prediction module 802, the prediction module controls the powering off or on of tape drives in the tape drive library 210 by sending instructions to the power control module 804. The power control module 804 powers off or on each specific tape drive in the tape drive library 210 based on instructions transmitted by the prediction module 802.

The prediction module 802 keeps information about each of the tape drives in the tape drive library 210 and their power state that is illustrated in the state table 400 of FIG. 4.

State table 400 comprises four columns, wherein first column includes the unique drive World-Wide-Node-Name 402 of a specific tape drive. The WWNN is a unique identifier for each tape drive in a tape drive library, for example in FIG. 4, the hexadecimal code, "2000FE506040F6." Alternatively, this can be the serial number of the tape drive which is also unique, or the tape drive's Media Access Code address (MAC address). The WWNN and the serial number are reported by the tape drive to the backup application via prior art means such as SCSI INQUERY command.

The second column includes the power state of the drive 404. This power state is continuously updated in process 300 of FIG. 5 described here below. Three power states may be defined as, 1) IDLE, and ON, 2) ACTIVE, and ON, or 3) OFF, where ACTIVE and ON correspond to a state of data transmission. The power state is continuously tracked and updated for each tape drive by the prediction module 802.

The third column stores a number representing the operating time 406. The operating time is defined by the sum of the time where the drive is in a powered on state. This cumulative number represents how long the tape drive has been in a continuously powered on state. This number might be expressed in hours or in other unit corresponding to an expression of time, for example in FIG. 4, "423" minutes. The operating time is continuously tracked and updated for each tape drive by the prediction module 802.

In the fourth column, a time when the tape drive is idle, (not active), and powered on is tracked 408. This time is reset as soon as a tape is mounted in the tape drive or when a tape drive is powered off, for example in FIG. 4, "20" minutes. The idle time is continuously tracked and updated for each tape drive by the prediction module 802.

The backup server 207 with the prediction module 802 keeps data in each row of the state table 400 for each tape drive which is attached to the backup server 207.

FIG. 5 illustrates a prediction process 300 that implements a process to control the power state of each tape drive in the tape drive library 210 as controlled by the prediction module 802 from the backup server 207.

The process starts in step 302 and continues to step 304 where the server checks if a restore request for data from tape is present. If the answer in step 304 is "yes," the process flows to step 308 explained later. Otherwise, if the answer in step 304 is "no," then the process flows to step 306.

In step 306, the backup server 207 checks the backup schedules and if a backup is scheduled to start within the next 5 minutes. A backup schedule usually comprises information about the client name, number of session, start date and start time. The prediction module 802 simply compares if the start date and start time of the schedule is equal or less than the current date and time. If the answer in step 306 is "yes," indicating that a client backup will shortly occur, then the process flows to step 308 explained later. Otherwise, if no backup is scheduled for the next 5 minutes, the process flows back to the starting step 302.

In step 308, the process determines the number of tape drives required for that operation. If the process is a scheduled backup, the backup server derives this information from the schedule information item, i.e., the number of the session. The number of session is equivalent to the number of tape drives required for backup. If the process is a requested restore procedure, the number of drives allocated is equivalent to the number of restore sessions which are initiated by the backup client 202.

In step 310, the backup server 207 checks how many tape drives are powered on and not used, or idle, and compares it against the number of drives determined in step 308. The backup server 207 then utilizes the state table 400 by tracking each tape drive the WWNN 402, the power state of the tape drive 404, the operating hours 406, and the idle time 408. If in step 310 the number drives which are powered on and not used are less than the required number of tape drives, then the process flows to step 311.

In step 311, the prediction module 802 selects the tape drives to be powered on utilizing the state table 400. The module 802 selects specific tape drives identified by the assigned WWNN 402 address which are in powered off state 404 and have the least number of operating time 406.

In step 312, the predication module 802 then sends a command to the power control module 804 instructing it to power on those specific selected tape drives.

In an alternate embodiment, the tape drive power on operation in step 312 is deferred in order to wait to determine if tape drives used by other processes become idle while still under power. Thus in step 310, process 300 may wait for a specific time which is configurable by the user.

In step 313, the state table 400 is updated with the new power state 404 for the selected tape drives identified by a unique WWNN 402 which have been instructed to be powered on in step 312. Additionally, the operating time 406 counter and the idle time 408 counter for the selected tape drives which have been powered on in step 312 are restarted in step 313. From step 313, the process flows to step 314 which is explained later.

If in step 310, the answer is "no," indicating that the required number of tape drives, (as determined in step 308), is powered on and not used, or idle, then the process continues to step 314.

In step 314, the backup server 207 performs an operation which may be a backup 212 or restore 214 operation.

In step 316, the backup server 207 checks if the operation was performed successfully. If the answer in step 316 is "no," the process flows back to step 314. Otherwise, if the answer is "yes," then the process flows to step 317.

In step 317, the process determines for each tape drive the cumulative power on 406 and idle time 408 which is tracked in state table 400. The idle time 408 identifies the consecutive time a tape drive is kept in idle in a powered on state before it is powered off.

In step 318, the process determines the tape drives where the consecutive idle times 408 determined in step 317 are greater than a threshold $T_{on}$. The time threshold $T_{on}$ describes a maximum time a tape drive should be idle, (i.e., having no data communication activity), and powered on. If the answer in step 318 is "yes," the process flows to step 319 explained later. Otherwise, if the answer is "no," indicating that a tape drive attached to the backup server has not exceeded the idle time limit threshold $T_{on}$, the process flows to the ending step 330.

In step 319, the prediction module 802 instructs the power control module 804 to power off any tape drives which have been determined in step 318 to have not exceeded the threshold $T_{on}$.

In step 320, the backup server 207 updates the tracking table 400 and the power state 404 is changed for the tape drives which have been powered off in step 319. In addition, the counters for the operating time 406 and the idle time 408 are stopped for the tape drives which have been powered off in step 319.

From step 320 the process flows to the ending step 330.

Power Control Module

Different embodiments are described for the implementation of the power control module 804 hereafter. In one embodiment, the power control module 804 is implemented in each tape drive. Thus, each tape drive includes the logic to power off or on the tape drive based on the instruction of the prediction module 802. The prediction module 802 sends a SCSI command to the power control module 804 instructing it to power off or on a particular tape drive denoted by the WWNN or serial number.

Figure 6:
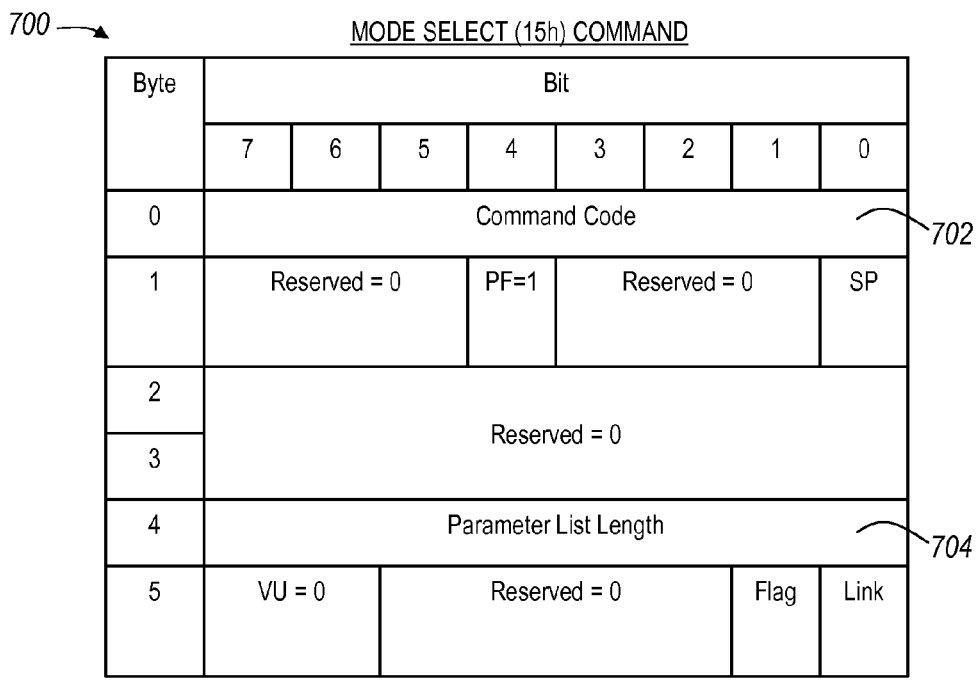
FIG. 6 illustrates a first exemplary embodiment of server-managed power saving method for automated tape libraries and drives, showing a mode select command table, according to an exemplary aspect of the present invention.

FIG. 6 illustrates the SCSI MODE SELECT command 700 according to prior art specifying a new mode page 15h (h stands for hexadecimal) can be used for this purpose.

The mode select command 700 of FIG. 6 allows sending a mode page from the backup server 207 to the tape drive in a tape drive library 210. It has a command code 702 of 15h, where the suffix h denotes hexadecimal or base 16. This command code 702 instructs the tape drive that this is a mode select command. The parameter list length 704 specifies the size of the mode page to be transferred in bytes.

Figure 7:
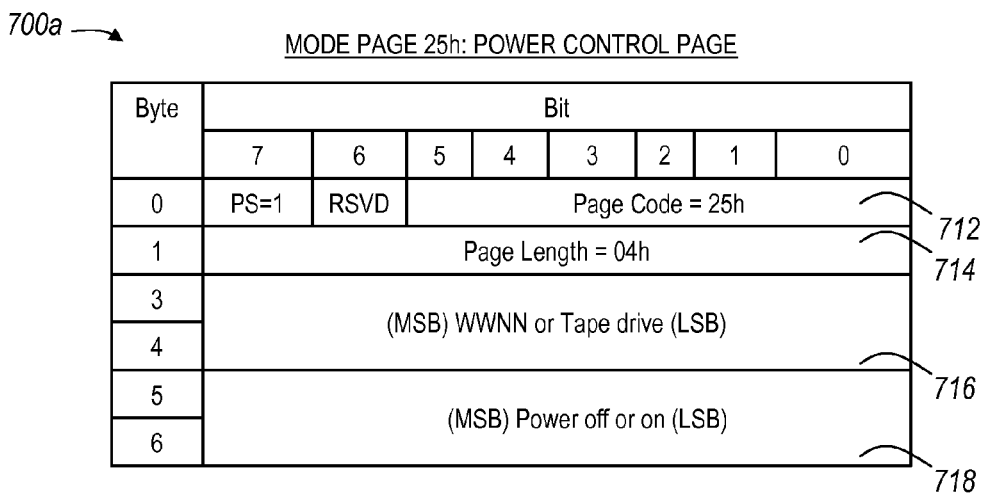
FIG. 7 illustrates a first exemplary embodiment of server-managed power saving method for automated tape libraries and drives, showing a mode page power control table, according to an exemplary aspect of the present invention.

Subsequently to sending this command, the backup server 207, (or an initiator), will send the actual mode page 700a as shown in FIG. 7, illustrating the "Mode page 25h: Power Control Page." The mode select command is followed by a mode parameter header, a block descriptor and one or more mode pages such as mode page 700a.

The exemplary mode page 700a has the page code 712 of 25h, where the suffix h denotes hexadecimal or base 16, and a page length 714 of 04h which indicates that there are 4 bytes of additional parameters being sent. Parameter 716 includes the tape drive identifier (WWNN or serial number) as determined in step 311. Mode page Parameter 718 includes the power state to be performed. The power state can be expressed by a hexadecimal number where "0000h" designates power off and "0001h" designates power on. Upon reception of this command, the power control module 804 pertaining to the tape drive, powers on or off the tape drive depending on the value of the parameter 718.

In another embodiment, the power control module 804 is implemented in the library controller which is usually represented as the control path device. In this embodiment, the prediction module 802 uses a SCSI MODE Select command 700 with an associated mode page 700a to instruct the library controller to power on or off a tape drive in the tape drive library 220. Based on the WWNN of the tape drive 716 and power state 718 sent to the library controller (or control path drive) the prediction module 802 instructs a drive-power-switch-nodecard 1000 (see FIG. 9) to change the power state of a tape drive. The drive-power-switch nodecard 1000 changes the power state accordingly by closing or opening the power line for that drive. This embodiment is further detailed below with respect of FIG. 9.

Figure 8:
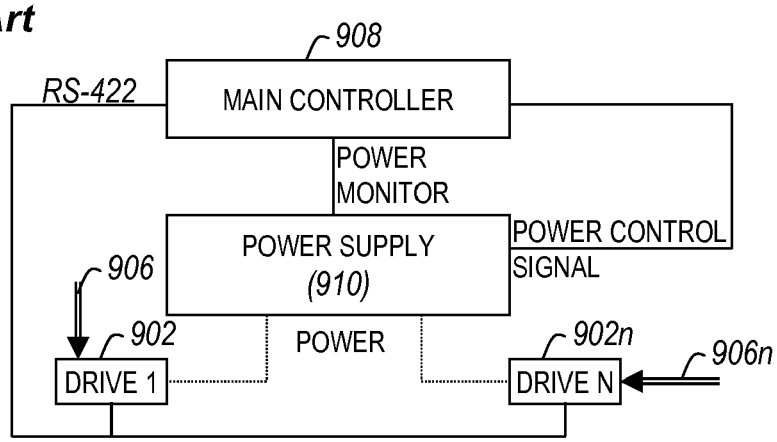
FIG. 8 illustrates a prior art embodiment of a controller scheme for controlling the power to a tape drive library.

FIG. 8 represents a prior art power scheme that illustrates the components pertaining to the power scheme including of a library frame interconnect card, (not shown), that includes tape drives represented by drives "1" to "n," 902-902n.

In FIG. 3, the network 220 which connects the tape drives of the tape drive library 210 to the host system such as a backup server 207 may be via a fiber channel link 906-906n for each tape drive 902-902n, as illustrated in FIG. 8. Via this fiber channel link 906, the backup server 207 may read and write data to the tape drive library 210, represented by drives "1" to "n" 902-902n. The backup server 207 and more precise the prediction module 802 can also send the SCSI MODE SELECT command 700 to the tape drive 902 via link 906. The tape drive can pass information such as WWNN of a tape drive 716 and the power state 718 to the main controller 908 via the RS422 Interface. This allows the backup server 207 to communicate with the library main controller 908. Usually there is one main controller 908 which is connected to each frame via the frame interconnect card, (not shown). The main controller 908 might also include the logic to control the library robotic (not shown). The tape drives 902-902n are also connected to a power supply 910 providing power. In the alternative, there may be separate power supplies providing redundant power to the tape drives. Thus, if one power supply fails the other one continues to provide power to the tape drives.

Figure 9:
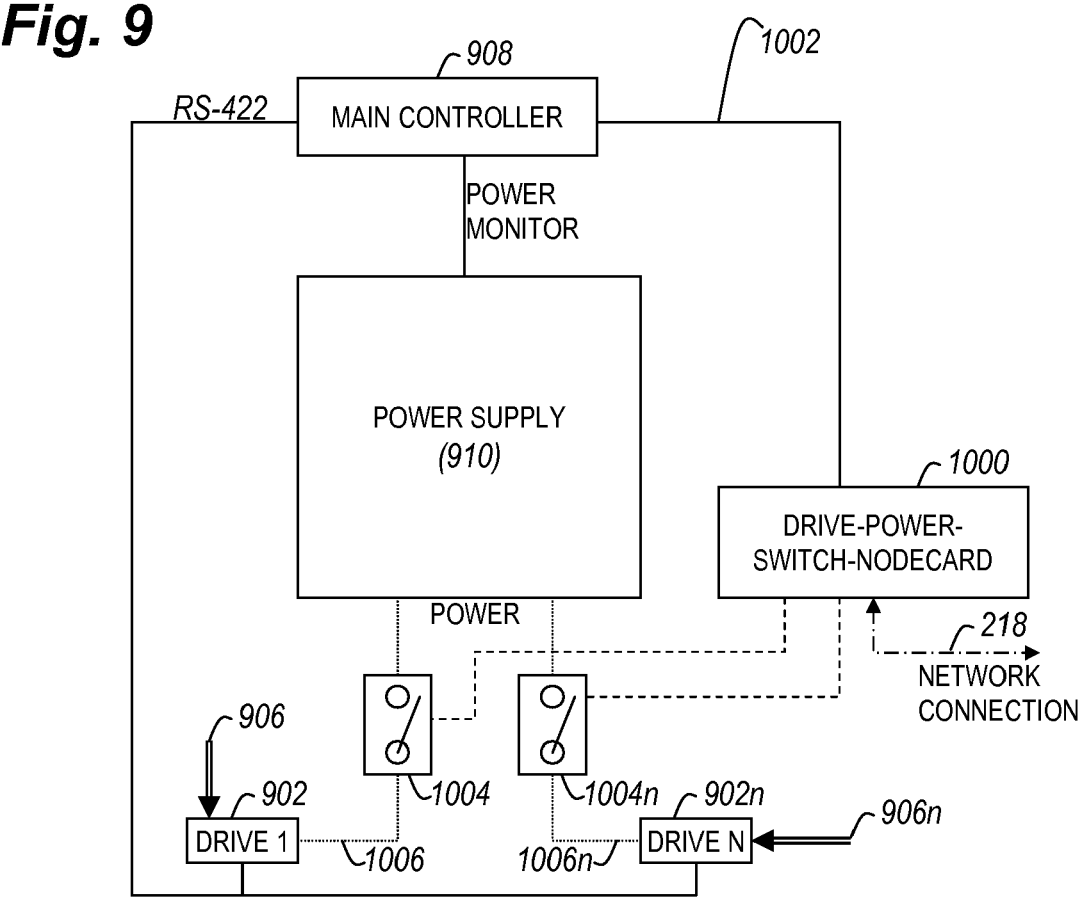
FIG. 9 illustrates a first exemplary embodiment of server-managed power saving method for automated tape libraries and drives, showing a power controlling scheme according to an exemplary aspect of the present invention.

In order to implement the second embodiment of this invention, the power scheme according to prior art of FIG. 8 must be changed in accordance with FIG. 9, illustrating a Power Scheme according to the present invention with a Drive-Power-Switch-Node card 1000 added.

According to FIG. 9, a power control module 1000 is added (alternatively described as a drive-power-switch node card 1000 in FIG. 9). The power control module 1000 is connected to the main controller 908 via Controller Area Network (CAN) bus 1002. The instruction to power off or on a drive comes from the main controller 908 which receives a command through tape drive 902 initiated from the prediction module 802 of the backup server 207 via the SCSI MODE SELECT Command 700. Based on this instruction the power control module is now able to control the power for to the tape drives 902-902n. Therefore the power control module 1000 is also connected to electronic switches 1004-1004n installed in the power line 1006-1006n for every drive 902-902n. The electronic switches 1004-1004n switch the power off or on for a certain drives 902-902n. If there are separate power supplies providing redundant power to the tape drives 902-902n, then two electronic switches must be controlled to power off or on a single tape drive simultaneously.

In yet another embodiment, the backup server 207 uses an out-band connection to the power control module 1000 to the power off or on a tape drive via the network connection 218. The out-band connection can be based on an Ethernet protocol using Simple Network Management Protocol (SNMP) or other prior art methods for messaging. The message sent from the prediction module 802 to the power control module 804 of the tape drive library includes the WWNN of the tape drive 402 and the target power state 406. The control module 804 implemented in control module 1000 of the tape drive library 210 receiving that out-band message identifies the location of the tape drive based on the location encoding in the WWNN and sends a corresponding command to the according power control module 804. The power control module 804 then executes the power state to the designed tape drive accordingly.

Having such a method enables the backup-server via the prediction module to control the power state of tape drives based on actual or planned (scheduled) activities. This saves energy and reduces of $CO_2$ emission.

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A method for controlling power to a tape drive in an automated tape drive library, said method comprising:

determining if a request to perform an operation to one of restore data stored in said tape drive library, and to backup data to said tape drive library has been made, wherein said operation to backup data further includes retrieving a backup schedule and determining from said schedule when said requested backup is to be performed;

determining a required number of tape drives for said requested operation;

determining an available number of powered tape drives in said tape drive library;

selecting specific tape drives from said tape drive library based on determining if said required number of tape drives is greater than said available number of powered tape drives in said tape drive library;

commanding a power control module to power said selected specific tape drives from said tape drive library;

updating a power state value and resetting a cumulative operating time value for each of said selected specific tape drives;

performing said requested operation and repeating until completed if said requested operation is incompletely performed;

determining said cumulative operating time value and a cumulative idle time value of each tape drive in said tape drive library;

determining tape drives in said tape drive library that include said cumulative idle time value greater than a predetermined idle time threshold;

commanding to power off said determined tape drives in said tape drive library that include said cumulative idle time value less than said predetermined idle time threshold; and updating said power state value, and resetting said cumulative operating time value and said cumulative idle time value for each of said determined tape drives in said tape drive library.

\* \* \* \* \*